No. 851,899. PATENTED APR. 30, 1907.
D. R. & O. D. SALISBURY,
D. R. SALISBURY, GUARDIAN OF O. D. SALISBURY, A MINOR.
VEHICLE TIRE.
APPLICATION FILED NOV. 16, 1905.
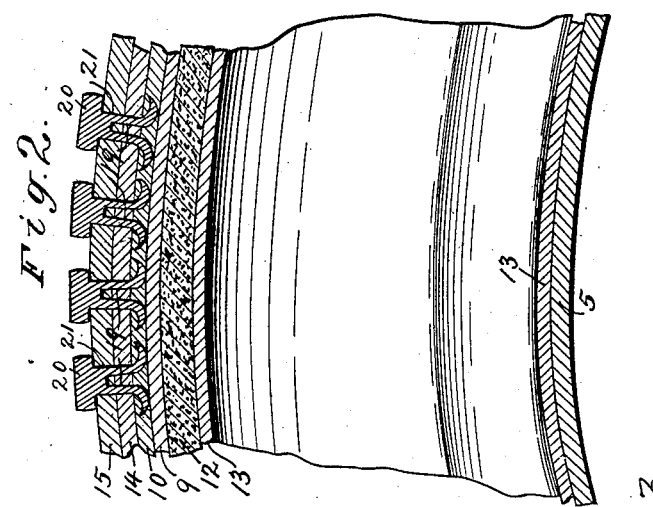
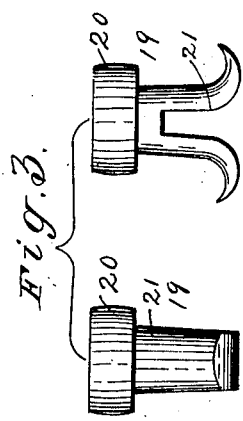
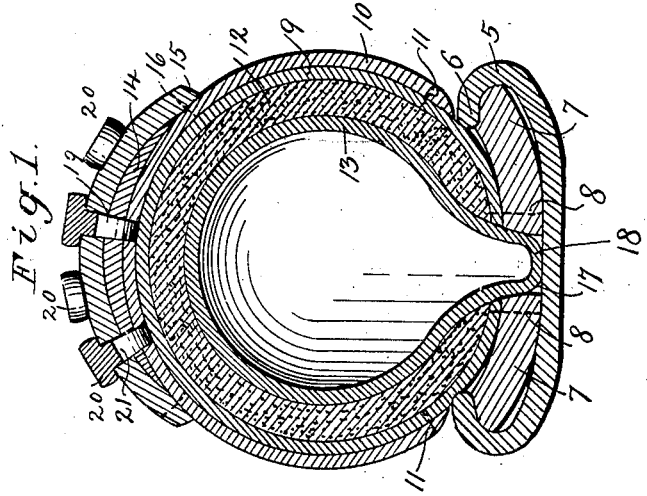
Witnesses
C. H. Whipple Jr
B. Y. Gardner.
Inventors
David R. Salisbury
Oliver D. Salisbury
By Shepherd & Parker
Attorneys

UNITED STATES PATENT OFFICE.

DAVID R. SALISBURY AND OLIVER D. SALISBURY, OF OWOSSO, MICHIGAN; SAID DAVID R. SALISBURY FOR HIMSELF AND AS GUARDIAN OF SAID OLIVER D. SALISBURY, A MINOR, ASSIGNOR TO SALISBURY TIRE COMPANY, OF OWOSSO, MICHIGAN, A CORPORATION.

VEHICLE-TIRE.

No. 851,899.     Specification of Letters Patent.     Patented April 30, 1907.

Application filed November 16, 1905. Serial No. 287,631.

*To all whom it may concern:*

Be it known that we, DAVID R. SALISBURY and OLIVER D. SALISBURY, citizens of the United States, residing at Owosso, in the county of Shiawassee and State of Michigan, have invented certain new and useful Improvements in Vehicle-Tires, of which the following is a specification.

My invention relates to pneumatic vehicle tires and has for its object the provision of a device of this character which may be readily applied to, or removed from a clencher rim when desired and also will not be liable to become punctured.

A further object of the invention is the provision of a vehicle tire which will be very resilient, but will be provided with what is practically a metallic tread portion, every part of said tread portion being capable of movement with relation to the rest of the tread portion, whereby the resiliency of the tire as a whole will be greatly increased.

A further object of the invention is the provision of a vehicle tire separated at its lower portion and having an inner inflatable tube provided with a depending portion which lies between the separated lower portions of the outer tire in such manner as to force the lower portions of the outer tire apart when said inner tube is inflated, to thereby hold the tire proper into engagement with the wheel rim.

Further objects and advantages of the invention will be set forth in the detailed description which now follows.

In the accompanying drawing: Figure 1 is a transverse vertical section of a vehicle tire constructed in accordance with the invention. Fig. 2 is a longitudinal vertical section of a portion of said tire, and Fig. 3 illustrates a bifurcated stud which will be hereinafter described.

Like numerals designate corresponding parts in all of the figures of the drawing.

Referring to the drawing the numeral 5 designates a clencher rim such as is ordinarily used upon automobiles. By referring to Fig. 1 it will be seen that this rim is provided with in-turned flanges 6 which overlie clencher beads 7. Stitched to these beads as at 8, is a leather covering 9 which is in turn covered by an outer leather covering 10 stitched at 11 to covering 9. A relatively thick canvas lining 12 increases the protection afforded an inner tube 13. A filling strip 14 gives increased curvature to a tread portion 15 which is stitched at 16 to outer covering 10. The canvas lining 12, leather covering 9, outer covering 10, filling strip 14 and tread portion 15 comprise the outer tire, the lower portion of which is separated as at 17 to provide a channel in which a depending portion 18 of inner tube 13 lies. Studs 19 comprising heads 20 and bifurcated shanks 21 are forced through tread portion 15, filling strip 14 and the lower ends of the bifurcated shanks and are then upset in the outer covering 10 to thereby hold said stubs against accidental displacement. The studs 19 are disposed in rows, the studs of alternate rows being staggered with relation to each other. The inner tube 13 is formed of rubber, the inner lining 12 of the outer tube is made of canvas, the inner covering 9, outer covering 10, filling strip 14 and tread portion 15 are made of comparatively flexible leather. The clencher beads 7 are made of rigid sole leather, said bead portions being forced, when the inner tube 13 is inflated, under the in-turned flanges 6, whereby the tire as a whole is held securely in engagement with the rim 5. The canvas lining 12 provides protection to inner tube 13 while the tread portion 15 is held from engagement with the ground by studs 19, the heads 20 of which take the wear incident to the use of the tire upon automobiles or other heavy vehicles.

Since the tread portion of the tire is held from engagement with the ground, the likelihood that the tire will be punctured is greatly reduced. By staggering the studs of one row with relation to the studs of the next row, a practically continuous metallic tread is provided. By upsetting the shanks of the studs in the manner illustrated in Fig. 2 of the drawing, said studs are prevented from being withdrawn from the tread of the tire. If these studs were not upset in this manner the use of the tire upon asphalt which had become softened by the heat of the sun in summer, would result in the studs 19 sticking to said asphalt and being withdrawn from the tire as the wheels revolve.

While the herein described elements are well adapted to serve the purpose for which they are intended, it is to be understood that the invention is not limited to the precise construction set forth, but that changes within the scope of the appended claims may be resorted to without departure from said invention.

Having described my invention what I claim is:

1. A vehicle tire comprising an outer tube formed of an exterior layer of leather and an interior layer of canvas, said tube being split annularly, the confronting edges of said tube being flush with respect to said layers, annular stiff leather beads having their edges flush with the edges of said tube, said beads extending at an angle to said tube and being secured thereto by stitching, the confronting edges of said tube being spaced away, whereby an annular opening with flush sides of the material of said tube is afforded and an inner tube of rubber fitting snugly within the outer tube and formed with an integral imperforate depending portion fitting within said annular opening.

2. A vehicle tire comprising an inner tube, and an outer tube surrounding the same, said outer tube embodying a body portion, an annular arcuate filling strip imposed thereupon, an annular arcuate tread strip imposed thereupon and wholly overlying said filling strip, and studs formed with enlarged heads and bifurcated shanks projecting through said tread strip, said filling strip and said body portion, said shanks having their ends upset in said body portion.

3. A vehicle tire comprising an inner tube and an outer tube surrounding the same, said outer tube embodying a body portion, an annular arcuate filling strip imposed thereupon, an annular arcuate tread strip imposed thereupon and wholly overlying said filling strip, said tread strip being secured to said body portion by annular rows of stitching beyond said filling strip, and studs formed with enlarged heads and bifurcated shanks projecting through said tread strip, said filling strip and said body portion, said shanks having their ends upset in said body portion.

In testimony whereof we affix our signatures in presence of two witnesses.

DAVID R. SALISBURY.
OLIVER D. SALISBURY.

Witnesses:
G. L. TAYLOR,
I. H. KEELER.